United States Patent [19]

Wells

[11] Patent Number: 4,546,919
[45] Date of Patent: Oct. 15, 1985

[54] VENTILATOR ACTUATOR

[75] Inventor: David W. Wells, Brisbane, Australia

[73] Assignees: Jennifer Margaret Pierce; Daniel Graham Wells; Gordon William Wells, all of Queensland, Australia

[21] Appl. No.: 600,385

[22] Filed: Apr. 16, 1984

[30] Foreign Application Priority Data

Apr. 21, 1983 [AU] Australia .............. PF8999

[51] Int. Cl.⁴ ............................................. G05D 23/10
[52] U.S. Cl. ................................. 236/48 R; 236/49; 236/99 F
[58] Field of Search ............ 98/40 VT; 236/49, 48 R, 236/93 A, 101 R, 99 F, 99 R

[56] References Cited

U.S. PATENT DOCUMENTS

| | | | |
|---|---|---|---|
| 1,652,216 | 12/1927 | Replogle . | |
| 3,027,090 | 3/1962 | Zerhan, Jr. | 236/49 |
| 3,799,432 | 3/1974 | Schneider | 236/48 R |
| 3,862,718 | 1/1975 | Butler | 236/49 |
| 4,071,190 | 1/1978 | Ford, Jr. | 236/93 A |
| 4,210,277 | 7/1980 | Kolt | 236/49 |
| 4,236,668 | 12/1980 | Prikkel, III | 236/1 G |
| 4,402,455 | 9/1983 | Kolt | 236/93 B |

FOREIGN PATENT DOCUMENTS 86989 8/1982 Australia .
86990 8/1982 Australia .

Primary Examiner—William E. Wayner
Attorney, Agent, or Firm—Stevens, Davis, Miller & Mosher

[57] ABSTRACT

A ventilator actuator is provided for opening and closing a ventilator opening having a diaphragm secured to a closure member mounted for pivotal movement about an axis to form a reservoir for a heat responsive fluid between them, the diaphragm normally being retracted at a first temperature and extended at a second elevated temperature. An actuating member has one end secured to the diaphragm and spaced from the pivotal axis, the other end of the actuating member is anchored such that when the diaphragm expands the actuating member causes the closure member to pivot to open the ventilating opening. When the diaphragm retracts the closure member is caused to pivot back to close the ventilating opening.

9 Claims, 3 Drawing Figures

VENTILATOR ACTUATOR

This invention relates to improvements in ventilators. In particular it relates to improvements to ventilators and to means for actuating ventilators.

The internal temperature of a building is determined to a large degree by the temperature of the roof. In buildings having ceilings the air space between the ceiling and the roof can easily reach an elevated temperature of 150° C. and as this space is effectively a sealed space, this high temperature may be maintained for a protracted period adding significant heating effect to the interior of the building.

Various means have been used in the past to reduce this effect such as providing ceiling insulation to prevent heat conduction through the ceiling and utilizing forced ventilation to clear the hot air from the ceiling. Fixed vents are also used, however these have the disadvantage that during cold periods internal heat in the building is dissipated through the roof vent. Attempts have been made to provide vents having heat sensitive closure means but to date these have been of complicated construction and thus expensive to manufacture and maintain.

This invention aims at alleviating the disadvantages associated with such prior art and to provide an improved ventilator and actuator which will be reliable and efficient in use. Other objects and advantages of this invention will hereinafter become apparent.

According to one aspect the invention provides an actuator for a ventilator having a ventilating opening and at least one closure member for closing the opening, said actuator comprising a diaphragm directly securable to the closure member to form a reservoir between said diaphragm and the member for containing a heat responsive fluid, said diaphragm normally being retracted at a first temperature and extended at a second elevated temperature.

According to another aspect the invention provides a ventilator including an actuator as described above secured to the closure member of the ventilator and the closure member being pivotally mounted about an axis relative to the ventilating opening and wherein the point at which the one end of the actuating means is fixed to the diaphragm is spaced laterally from the pivotal axis.

In a preferred form the closure member is a one piece door pivotable about a hinge axis and the connection between the diaphragm and the actuating means is offset laterally from the hinge axis. The latter may be centrally disposed and the linkage means may comprise a rod inter-connecting the diaphragm with a fixed anchor point on the housing portion of the ventilator.

In order that this invention may be more readily understood and put into practical effect, reference will now be made to the enclosed drawings which illustrate a preferred embodiment of the invention wherein.

Figure 1:
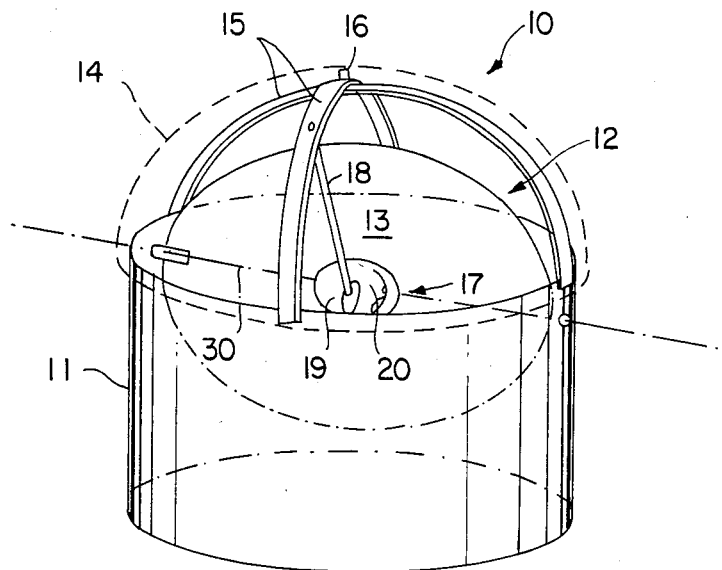
FIG. 1 is a perspective view of a ventilator made in accordance with the present invention and showing the weatherproofing cowl in dotted outline.

As shown in the drawing a typical ventilator 10 includes a cylindrical housing 11 which is adapted to be mounted on a roof to provide a ventilating opening 12 whereby the interior of the roof space may communicate with the atmosphere. Of course any suitable configuration of housing such as square or hexagonal may be utilized if desired. A closure member 13 is pivotally supported on an axis 30 adjacent the opening 12 for pivotal movement substantially about its diameteral axis for movement between an open position at which the atmosphere may communicate and through the opening 12 with the interior of the roof and a closed position at which the closure member 13 substantially closes the opening 12. The shroud or cowl 14 is supported about the opening 12 by a framework comprising a pair of arched members 15 connected at their bases to the housing 11. A central stud 16 is provided to secure the cowl removably in place. The lower edge of the cowl is spaced outwardly and downwardly from the upper edge of the housing 11 so that the opening 12 may communicate with the atmosphere through the space formed between the cowl 14 and the upper end of the housing 11.

Figure 2:
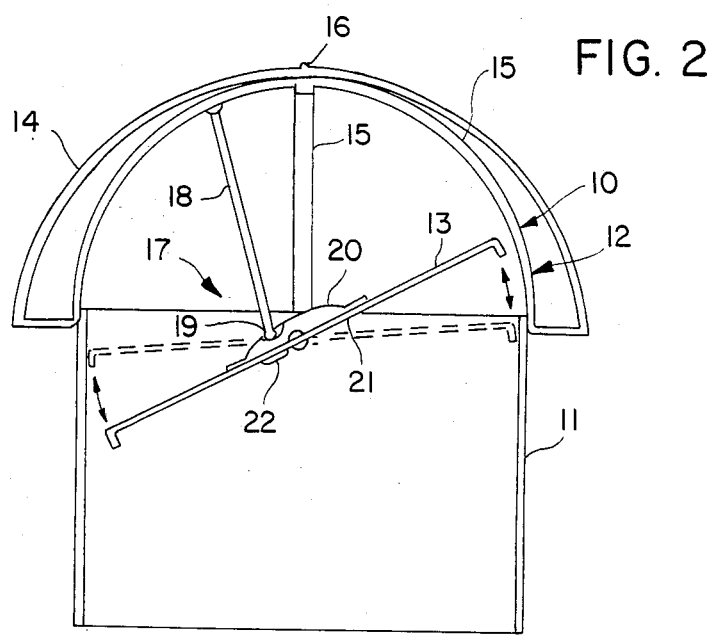
FIG. 2 is a cross sectional view of the ventilator of FIG. 1.

An actuator 17 is supported centrally on the closure member 13 and an actuating member or rod 18 extends between an offset mounting on the diaphragm and an anchor point on one of the arched members 15. This arrangement is illustrated in FIG. 2.

The actuator 17 has an upwardly extending diaphragm portion 20 which is of inverted saucer shape and which is sealably attached to the central portion 21 of the closure member 13. The member 13 is dished downwardly at 22 to accommodate the lower end of the rod 18 which is attached pivotally to a mounting bar on pivot pin 36 fixed to the diaphragm member 20 in an offset relationship to the pivot axis 30 of the closure member and closely adjacent the axis 30. At the point at which the rod 18 is secured to the diaphragm 20 the diaphragm may have a depression 35 for receiving and locating the rod. The end of the rod has a hole 37 for receiving pin 36. The diaphragm has a flange 38 about which the diaphragm is secured to the closure member. The space 24 between the diaphragm portion 20 and the base plate 21 is filled in this embodiment with freon 11 refrigerant gas although other suitable fluids may be used.

Figure 3:
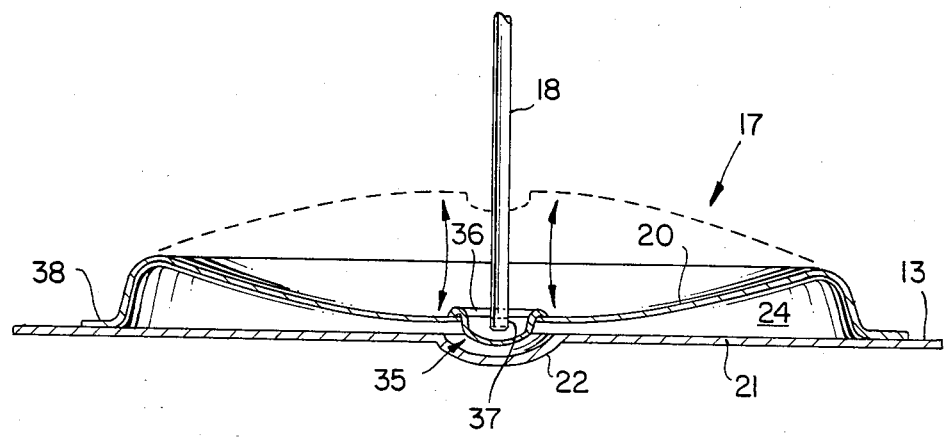
FIG. 3 is an enlarged cross sectional view showing the details of the heat sensitive actuating means.

The temperature within the space between the ceiling and the roof may reach 180° C. and of course it can fall to a low temperature substantially corresponding to ambient temperature which a temperature in the region of 24° C. is considered acceptable. In use the illustrated embodiment is arranged such that at temperatures below 24° C. or thereabout the diaphragm is biassed to a retracted position as illustrated in FIG. 3. In this position the rod 18 is adjusted to maintain the closure member 13 in the closed position. It is preferred that in the closed position the closure member be slightly inclined to the side of the housing. Thus the member is not at ninety degrees to the housing. As the temperature increases, the fluid in the space 24, which may exert a pressure of about 19 p.s.i. at 50° C., expands and causes the portion 20 to move upwardly or away from the base portion 21 into the extended position shown in broken outline in FIG. 3. As the rod 18 is of fixed length, this movement of the diaphragm portion 20 will result in the closure member pivotting to an open position. The degree of opening will be dependant upon the temperature causing expansion of the fluid in the space and of course as soon as the temperature within the ceiling area falls, the diaphragm portion 20 will retract and the closure member will move back towards its closed position.

It will be seen then that the amount of fluid contained within the diaphragm assembly, the length of the rod 18 and its placement, and the degree of offset of the pivot pin 23 with respect to the pivot axis of the closure member may all be varied to suit the particular application and temperature requirements. Of course a ventilator according to the present invention may be made of any desired dimension, shape or form.

During hot conditions as the temperature above the ceiling of a building increases, the closure member 13 will open so that the hot air may excape from the ceiling to the atmosphere. This extraction of the air will at the same time cause incoming air at a lower temperature to be introduced into the area beneath the roof preferably in a layer above the ceiling and thus in effect a layer of lower temperature air may be maintained directly above the ceiling so as to keep the interior temperature of the building at a comfortable level. During cold periods the ventilator will close so that as the interior temperature of a building is elevated, heat losses therefrom through the ceiling will be minimized.

In a further form the closure member is weighted or otherwise biassed to either the open position or the closed position and the effect of expansion or contraction of the diaphragm is adapted to overcome the bias to move the panel to the opposite position. While not illustrated, the closure member need not be a flat plate and may comprise a louvre assembly operable by the actuator of the invention to move the louvres of the assembly between the closed and open positions.

What is claimed is:

1. An actuator for a ventilator having a ventilating opening and at least one closure member for closing the opening, said actuator comprising a diaphragm directly securable to the closure member to form a reservoir between said diaphragm and the member for containing a heat responsive fluid, an actuating member, one end of which is secured to said diaphragm, the other end of which, in use, is fixed to an anchor point, said diaphragm normally being retracted at a first temperature and extended at a second elevated temperature, said diaphragm in its retracted position being substantially saucer shaped or concave when viewed from above.

2. An actuator according to claim 1 wherein said diaphragm is circular in plan view and has a circumferentially extending flange enabling it to be secured to the closure member.

3. An actuator according to claim 1 wherein said diaphragm has a central depression within which said one end of said actuating member is located.

4. An actuator according to claim 3 wherein said one end has a hole and is attached to said diaphragm by a pin secured to the diaphragm and passing through the hole.

5. A ventilator including: a closure member, a ventilating opening normally closed by said closure member, said closure member being pivotally mounted about an axis relative to said opening and an actuator according to claim 1 with the other end of said actuating member fixed to the anchor point, the location of the securement of the one end of the actuating member to the diaphragm is spaced laterally from the pivotal axis about which the closure member may pivot whereby movement of the diaphragm to its extended position upon the fluid reaching the second temperature causes the actuating member to move the closure member from a position where it closes the opening to a position where it uncovers the opening.

6. A ventilator according to claim 5 including a housing and the ventilating opening is formed in the housing, said housing may be secured to a roof to ventilate the space within the roof.

7. A ventilator according to claim 6 wherein said closure member is a circular plate which has a depression adjacent the point at which the one end of the actuating member is secured to the diaphragm.

8. A ventilator according to claim 6 wherein the anchor point is located on the side of the closure member facing the roof space and spaced from the closure member.

9. A ventilator according to claim 6 wherein the anchor point is located on the side of the closure member directed away from the roof space and spaced from the closure member.

* * * * *